(12) United States Patent
Fujiwara et al.

(10) Patent No.: US 10,688,569 B2
(45) Date of Patent: Jun. 23, 2020

(54) REUSING METHOD OF END MILL

(71) Applicant: GREEN TOOL CO., LTD., Okayama (JP)

(72) Inventors: Masayoshi Fujiwara, Okayama (JP); Mitsuhiro Toda, Okayama (JP)

(73) Assignee: GREEN TOOL CO., LTD., Okayama (JP)

( * ) Notice: Subject to any disclaimer, the term of this patent is extended or adjusted under 35 U.S.C. 154(b) by 102 days.

(21) Appl. No.: 16/085,649

(22) PCT Filed: Jan. 23, 2017

(86) PCT No.: PCT/JP2017/002071
§ 371 (c)(1),
(2) Date: Sep. 17, 2018

(87) PCT Pub. No.: WO2017/163576
PCT Pub. Date: Sep. 28, 2017

(65) Prior Publication Data
US 2019/0084058 A1 Mar. 21, 2019

(30) Foreign Application Priority Data

Mar. 23, 2016 (JP) ................................. 2016-058486

(51) Int. Cl.
| | |
|---|---|
| *B23C 5/10* | (2006.01) |
| *B23P 6/00* | (2006.01) |
| *B23P 15/34* | (2006.01) |
| *B23C 3/36* | (2006.01) |

(52) U.S. Cl.
CPC .................. *B23C 5/10* (2013.01); *B23C 3/36* (2013.01); *B23P 6/00* (2013.01); *B23P 15/34* (2013.01); *B23C 2210/12* (2013.01); *B23C 2210/203* (2013.01); *B23C 2210/241* (2013.01);
(Continued)

(58) Field of Classification Search
CPC ... B23C 5/10; B23C 2210/44; B23C 2210/12; B23C 2210/203; B23C 2210/241; B23C 3/36; B23P 6/00; B23P 15/32; B23P 15/34; B23P 17/00; B23P 17/02; B23P 13/00; Y10T 409/20; Y10T 29/49718; Y10T 29/49721; Y10T 29/49723;
(Continued)

(56) References Cited

U.S. PATENT DOCUMENTS

2003/0002940 A1   1/2003   Forth et al.

FOREIGN PATENT DOCUMENTS

| CN | 101062539 A | 10/2007 |
|---|---|---|
| JP | 04-082612 A | 3/1992 |
| JP | 2000-190120 A | 7/2000 |

(Continued)

OTHER PUBLICATIONS

International Search Report for PCT/JP2017/002071 (dated Apr. 11, 2017).

*Primary Examiner* — Sarang Afzali
(74) *Attorney, Agent, or Firm* — Pearne & Gordon LLP

(57) ABSTRACT

A reusing method of an end mill involves machining a base material of an end mill in advance so as to have coaxiality equal accuracy to coaxiality for a cutting part, and when the cutting part is worn out, cutting off of the cutting part and machining a new cutting part on a shank part while a part of outer peripheral surface of the shank part is left as margin without cutting. The new cutting part has accuracy of coaxiality and an outer diameter identical to those of the cutting part.

2 Claims, 3 Drawing Sheets

(52) U.S. Cl.
CPC ..... *B23C 2210/44* (2013.01); *Y10T 29/49726* (2015.01); *Y10T 409/20* (2015.01)

(58) Field of Classification Search
CPC ......... Y10T 29/49725; Y10T 29/49726; Y10T 29/49748
USPC .............. 29/402.01, 402.03, 402.04, 402.05, 29/402.06, 402.19; 409/63; 76/101.1, 76/108.6; 451/48
See application file for complete search history.

(56) References Cited

FOREIGN PATENT DOCUMENTS

| | | |
|---|---|---|
| JP | 3082188 U | 11/2001 |
| JP | 2008-137096 A | 6/2008 |
| JP | 2009-148860 A | 7/2009 |
| JP | 2012-091259 A | 5/2012 |
| JP | 2015-039725 A | 3/2015 |

REUSING METHOD OF END MILL

TECHNICAL FIELD

The present invention relates to a reusing method of an end mill including a columnar shank part and a cutting part integrated with the shank part and used for cutting.

BACKGROUND

An end mill used for cutting has a cutting blade on an outer peripheral surface and an end surface and thus, it is capable not only of drilling but also of machining such as face milling, side milling, step milling, grooving, curved surface milling with one mill. Since an expensive metal material is used in the end mill, it is not economical to discard of the blade due to abrasion each time it is worn out. Thus, reusing by recovering a cutting performance has been carried out by polishing the cutting part.

On the other hand, if the polishing of the cutting part is repeated, a polishing margin is exhausted and thus, polishing has a limit. On the other hand, Patent Literature 1 proposes use of a single rotary cutting tool for a long time by forming a third cutting part by machining a first gripping part after a first cutting part and a second cutting part formed at the beginning on both sides of the first gripping part (corresponding to the shank part) are exhausted.

CITATION LIST

Patent Literature

Patent Literature 1: Japanese Patent Application Laid-open No. 2015-39725

SUMMARY

However, in the use method of the rotary cutting tool described in Patent Literature 1, the newly machined third cutting part has an outer diameter made smaller than the gripping part. That is, formation of the third cutting part is equal to formation of a new cutting part from a columnar raw material. Thus, in order to machine the third cutting part, machining with high accuracy is newly required similarly to the machining of the first cutting part and the second cutting part formed at the beginning.

The present invention has been made to solve the problem in related art as described above and has an object to provide a reusing method of an end mill which reduces a work load in machining of a new cutting part and enables efficient reuse.

In order to achieve the aforementioned object, a reusing method of an end mill of the present invention is a reusing method of an end mill including a columnar shank part and a cutting part integrated with the shank part, wherein the end mill has a margin which is a part of a circle having a diameter identical to a diameter of the shank part, the margin being provided on an outer edge of the cutting part in cross-section orthogonal to an axial direction, a base material of the end mill is machined in advance so as to have coaxiality having equal accuracy to coaxiality for the cutting part, the shank part is an unmachined part left without cutting the base material, the margin is a part of an outer peripheral surface of the base material left without cutting the base material when the outer edge is formed by cutting the base material, and when the cutting part is worn out, the cutting part is cut off and a new cutting part is machined on the shank part while a part of the outer peripheral surface of the shank part is left as the margin without cutting and without additional machining for ensuring formation of a new outer peripheral surface and accuracy of coaxiality, the new cutting part having a shape, accuracy of coaxiality, and an outer diameter identical to the shape, the accuracy of coaxiality, and the outer diameter of the cut-off cutting part, and in a plurality of re-manufacture processes, cutting parts newly machined one after another have a shape, accuracy of coaxiality, and an outer diameter identical to the shape, the accuracy of coaxiality, and the outer diameter of the original cutting part. According to this constitution, since the outer peripheral surface of the shank part is left as the margin, and the new cutting part is machined and thus, formation of the new outer peripheral surface is no longer necessary in machining of the new cutting part, machining for newly ensuring of accuracy of the coaxiality is no longer necessary, either, and a work load in new machining of the same cutting part as the original cutting part can be reduced, whereby efficient reuse is made possible.

Moreover, it is preferable that a line indicating a cut-off position of the cutting-off of the cutting part be formed along the outer periphery of the shank part in advance. According to this constitution, since the line is formed, not only that the cut-off position is made clear but also the number of times that re-machining is made possible can be checked, and an entire length in the re-machining is also known at the same time.

The present invention has an advantageous effect as described above, and since the new cutting part is machined with the outer peripheral surface of the shank portion left as a margin, in machining of the new cutting part, formation of the new outer peripheral surface is no longer necessary, the machining for newly ensuring the accuracy of the coaxiality is no longer necessary, either, and a work load in new machining of the same cutting part as the original cutting part can be reduced, whereby efficient reuse is made possible.

DETAILED DESCRIPTION OF THE EMBODIMENTS

Figure 1:
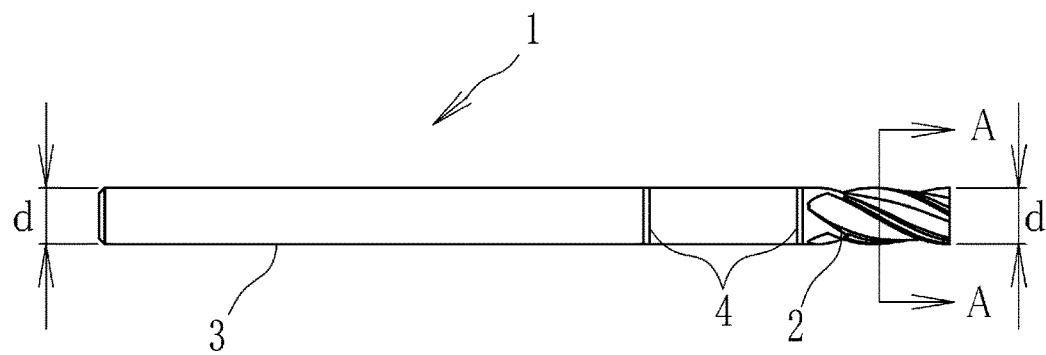
FIG. 1 is a side view illustrating an appearance of an end mill according to an embodiment of the present invention.

An end mill according to the present invention is a tool for cutting, has a cutting part both on a side surface and an end surface, is capable of cutting of a side surface of a work by an outer peripheral surface, and is capable of cutting of an upper surface of the work by the end surface. That is, machining such as face milling, side milling, step milling, grooving, curved surface milling, drilling, and boring with one mill is made possible. The present invention relates to an art of efficiently reusing the end mill. Hereinafter an embodiment of the present invention will be described by referring to the attached drawings. FIG. 1 is a side view illustrating an appearance of the end mill 1 according to the embodiment of the present invention.

In FIG. 1, the end mill 1 has a columnar shank part 3 integrated with a cutting part 2. The cutting part 2 is a part used for cutting, and the shank part 3 is a part to be fixed to a chuck of a machine tool such as a machining center. As will be described later in detail, a base material of the end mill 1 before machining the cutting part 2 is machined in advance so as to have coaxiality having equal accuracy to coaxiality for the cutting part 2.

Figure 2:
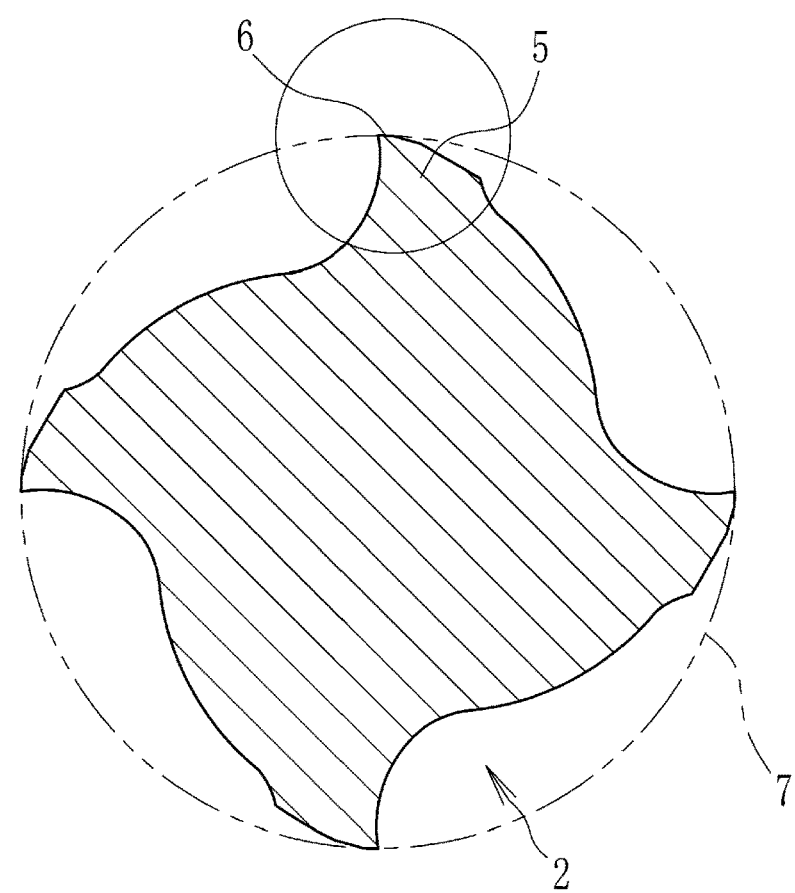
FIG. 2 is a sectional view on AA line in FIG. 1.
Figure 3:
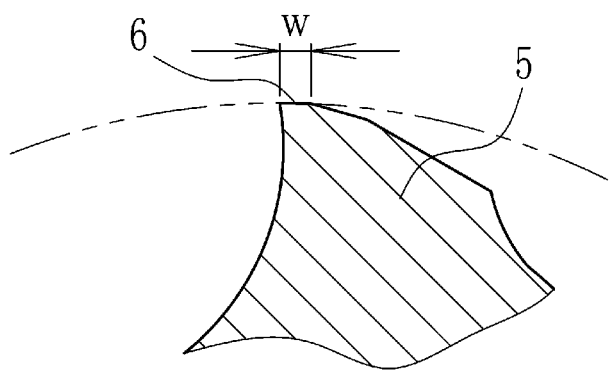
FIG. 3 is an enlarged view of an outer peripheral edge of a cutting part illustrated in FIG. 2.

FIG. 2 is a sectional view on an AA line in FIG. 1 and illustrates a sectional view of the cutting part 2 in a direction orthogonal to an axial direction of the end mill 1. FIG. 3 illustrates an enlarged view of an outer peripheral edge 5 of the cutting part 2 illustrated in FIG. 2. In FIGS. 2 and 3, a margin 6 having a width W is formed on the outer edge 5 of the cutting part 2. A formed surface of the margin 6 is on a circumference 7. A diameter of the circumference 7 is a diameter of the cutting part 2, and a diameter d (see FIG. 1) is equal to the diameter d of the shank part 3. The margin 6 is formed with the purpose of improving rigidity of the cutting part 2 and preventing chattering vibration during cutting.

Since the margin 6 is a part in contact with a cutting target, machining with high accuracy is required. The margin 6 is a part of the cutting part 2, and as described above, the formed surface of the margin 6 is on the circumference 7 and forms a part of a cylindrical surface. Therefore, ensuring of accuracy of this cylindrical surface is required for the cutting part 2. In this embodiment, accuracy of the cylindrical surface is specifically coaxiality.

In FIG. 1, the shank part 3 is the base material itself, and a section of the shank part 3, that is, a section of the shank part 3 in a direction orthogonal to the axial direction of the end mill 1 is a circular section, though not shown. In this embodiment, as described above, since the base material of the end mill 1 has been machined in advance so as to have coaxiality having equal accuracy to the coaxiality for the cutting part 2, the accuracy of the coaxiality required for the cutting part 2 has been already ensured for the shank part 3 which is the base material itself. As a result, when the new cutting part 2 is formed on the shank part 3 for the reuse, a work load is reduced, and efficient reuse is made possible. Hereinafter, the reusing method of the end mill according to this embodiment will be described specifically by describing a manufacturing process and a process of reuse of the end mill 1.

Figure 4A:
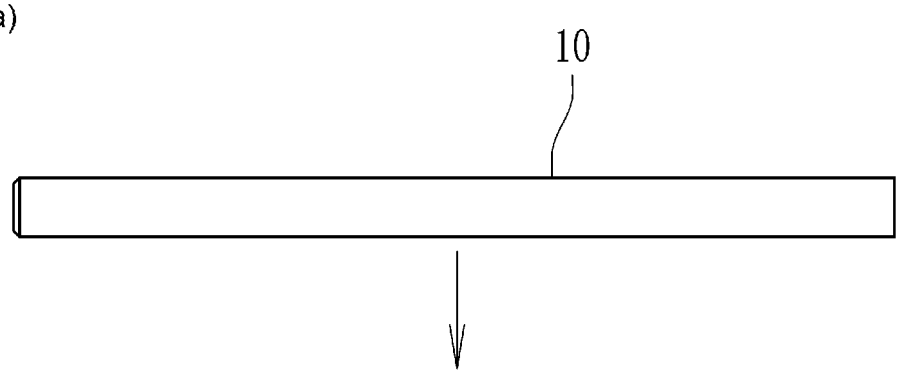
FIGS. 4(a)-4(d) are side views illustrating a manufacturing process and a process of reuse of the end mill according to the embodiment of the present invention.

FIGS. 4(a)-4(d) are side views illustrating the manufacturing process and the process of reuse of the end mill 1 according to this embodiment. FIG. 4(a) illustrates a base material 10 of the end mill 1. The base material 10 is a columnar member, and the base material 10 is machined in advance so as to have coaxiality having equal accuracy to coaxiality for the cutting part 2.

The accuracy of coaxiality of the base material 10 is not particularly limited but is preferably 5 μm or less. As will be described later, in this embodiment, the accuracy of coaxiality of the base material 10 is ensured as the accuracy of coaxiality of both the cutting part 2 in a new product state and the cutting part 2 manufactured by re-machining. In this case, if the accuracy of coaxiality is 5 μm or less, both the cutting part 2 in a new product state and the cutting part 2 manufactured by re-machining are suitable for cutting with high accuracy.

Moreover, by improving the accuracy of coaxiality, roundness and radial run-out accuracy can be also improved. In the base material 10 manufactured by the inventor of the present application, the roundness can be made to 5 μm or less and the radial run-out accuracy to 5 μm or less by setting the accuracy of coaxiality to 5 μm or less.

Even if the cutting part 2 is worn by using the end mill 1 for cutting, it can be used again by polishing the cutting part 2, but since the polishing margin is lost after repetition of the polishing, polishing has a limit. The reusing method of the end mill 1 according to this embodiment is to machine the new cutting part 2 on the shank part 3 when the cutting part 2 has come to the limit of polishing and the end of life.

Figure 4B:
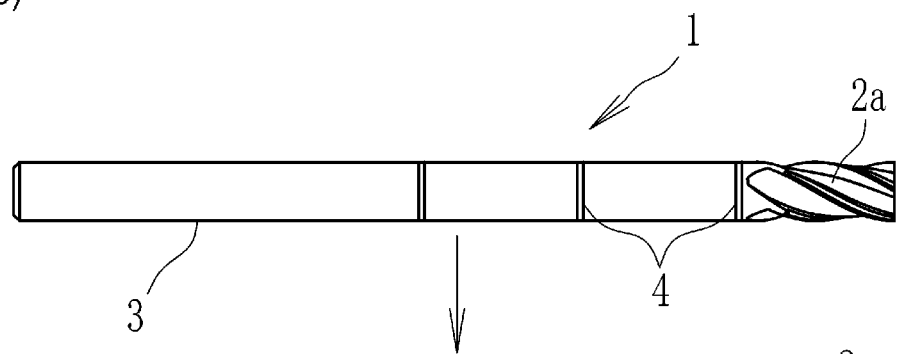

In this embodiment, for convenience, the original cutting part 2 is referred to as a first cutting part 2a, the cutting part 2 re-machined for the first time as a second cutting part 2b, and the cutting part 2 re-machined for the second time as a third cutting part 2c. FIG. 4(b) illustrates a manufacture completed state (new product state) of the end mill 1. The first cutting part 2a in this figure forms the margin 6 (see FIGS. 2 and 3) which is a part of the cylindrical surface having a diameter identical to the diameter of the shank part 3.

That is, the margin 6 is a surface of the base material 10 itself, and the accuracy of the coaxiality of the first cutting part 2a obtained by leaving the surface of the base material 10 as the margin 6 is equal to the accuracy of coaxiality of the base material 10. Therefore, if the accuracy of the coaxiality of the base material 10 is 5 μm or less, the accuracy of the coaxiality of the first cutting part 2a is also 5 μm or less. Thus, in machining of the first cutting part 2a, machining for ensuring the accuracy of the coaxiality is no longer necessary.

As illustrated in FIG. 4(b), a line 4 is formed on the shank part 3. The line 4 indicates a cut-off position when the cutting part 2 which has come to the end of life is to be cut off. Since the line 4 is formed, not only that the cut-off position is made clear but also the number of times that re-machining is made possible can be checked, and the entire length in the re-machining is also known at the same time.

Figure 4C:
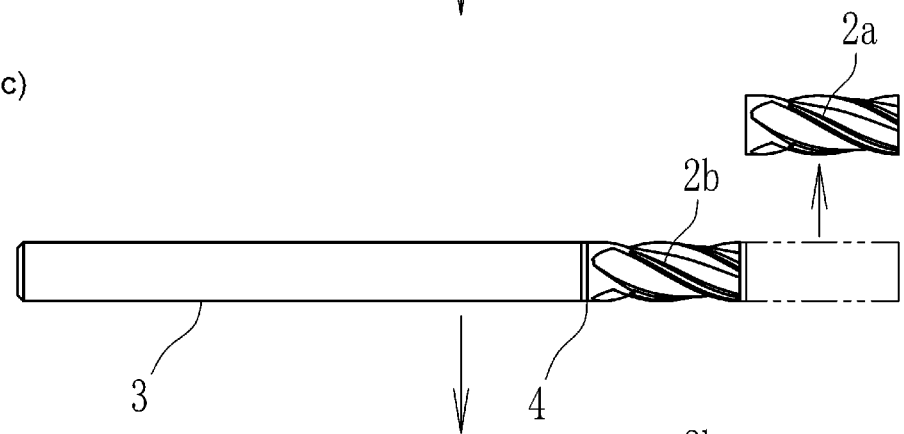

FIG. 4(c) illustrates a state where, when the first cutting part 2a is worn out, the first cutting part 2a is cut off at the position of the line 4, and the second cutting part 2b is machined on the shank part 3. The second cutting part 2b has the same shape as that of the first cutting part 2a. Regarding the machining of the second cutting part 2b, the shank part 3 is machined while a part of the outer peripheral surface of the shank part 3 is left as the margin 6 (see FIGS. 2 and 3).

In this machining, since the margin 6 is a part of the outer peripheral surface of the shank part 3, the machining for forming a new outer peripheral surface for forming the margin 6 is no longer necessary in machining of the second cutting part 2b. And since the shank part 3 is machined with the same accuracy of coaxiality as the first cutting part 2a, the accuracy of coaxiality of the second cutting part 2b is equal to that of the first cutting part 2a. That is, in machining of the second cutting part 2b, too, machining for ensuring the coaxiality is no longer necessary.

Figure 4D:
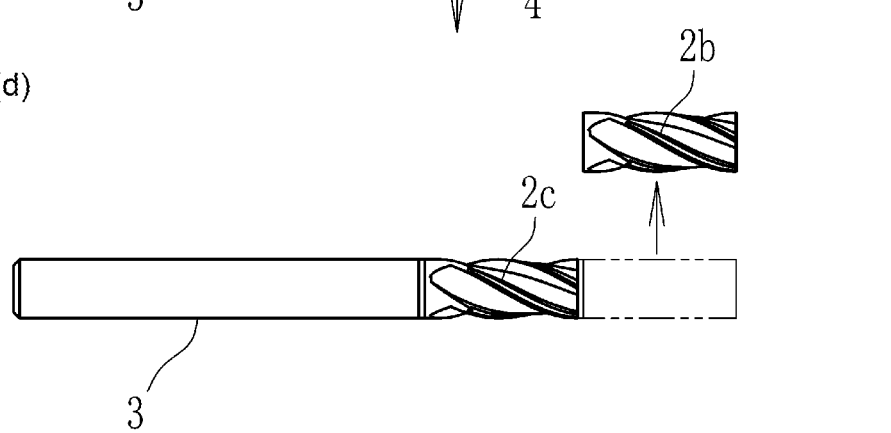

FIG. 4(d) illustrates a state where, when the second cutting part 2b is worn out, the second cutting part 2b is cut off at the position of the line 4, and the third cutting part 2c is machined on the shank part 3. A machining procedure of the third cutting part 2c is similar to the case of the first cutting part 2a and the second cutting part 2b, and in the machining of the third cutting part 2c, the shank part 3 is machined while a part of the outer peripheral surface of the shank part 3 is left as the margin 6 (see FIGS. 2 and 3).

In this machining, too, similarly to the case where the first cutting part 2a and the second cutting part 2b are machined, the margin 6 is a part of the outer peripheral surface of the shank part 3. Thus, in machining of the third cutting part 2c, the machining for forming a new outer peripheral surface for forming the margin 6 is no longer necessary. And since the shank part 3 is machined with the same accuracy of coaxiality as the first cutting part 2a, the accuracy of coaxiality of the third cutting part 2c is equal to that of the first cutting part 2a. That is, in machining of the third cutting part 2b, too, machining for ensuring the coaxiality is not necessary.

Therefore, according to the reusing method of the end mill according to the embodiment, both of the second cutting part 2b and the third cutting part 2c newly machined one after another have outer diameters, shapes, and accuracy of coaxiality identical to those of the original first cutting part 2a. On the other hand, according to the reusing method of the end mill according to the embodiment, since the new cutting part 2 is machined while the outer peripheral surface of the shank part 3 is left as the margin 6 as described above, in machining of the new cutting part 2, formation of a new outer peripheral surface is no longer necessary. Thus, the machining for newly ensuring the accuracy of coaxiality is no longer necessary. That is, according to the reusing method of the end mill according to the embodiment, the work load in new machining of the same cutting part 2 as the original cutting part 2 can be reduced, whereby efficient reuse is made possible.

Moreover, according to the reusing method of the end mill according to the embodiment, when the cutting part 2 is worn out, not only that the cutting using the new cutting part 2 can be made but also, as described above, the work load in new machining the cutting part 2 can be reduced, and efficient reuse can be made possible. As a result, in addition to cost reduction by the reuse, a manufacturing cost of the new cutting part 2 can be also reduced, and a great effect also in a cost aspect can be obtained. For example, a large number of end mills manufactured from expensive metal materials are used for machining an aircraft material and thus, a drastic cost reduction in tool costs can be promoted by using the reusing method of the end mill according to the embodiment.

The embodiment of the present invention has been described, but the present invention is not limited to that and includes constitutions changed as appropriate. For example, a case of two units of the newly machined cutting parts 2 is described in the embodiment but the number of units may be three or more. Moreover, the line 4 may be formed over the entire circumference of the base material 1 or may be formed partially.

REFERENCE SIGNS LIST 1 end mill
2 cutting part
2a first cutting part
2b second cutting part
2c third cutting part
3 shank part
4 line
5 outer edge
6 margin
10 base material

What is claimed is:

1. A reusing method of an end mill comprising a columnar shank part and a cutting part integrated with the shank part, wherein
   the end mill has a margin which is a part of a circle having a diameter identical to a diameter of the shank part, the margin being provided on an outer edge of the cutting part in cross-section orthogonal to an axial direction;
   a base material of the end mill is machined in advance so as to have coaxiality having equal accuracy to coaxiality for the cutting part;
   the shank part is an unmachined part left without cutting the base material;
   the margin is a part of an outer peripheral surface of the base material left without cutting the base material when the outer edge is formed by cutting the base material; and
   when the cutting part is worn out, the cutting part is cut off and a new cutting part is machined on the shank part while a part of the outer peripheral surface of the shank part is left as the margin without cutting and without additional machining for ensuring formation of a new outer peripheral surface and accuracy of coaxiality, the new cutting part having a shape, accuracy of coaxiality, and an outer diameter identical to the shape, the accuracy of coaxiality, and the outer diameter of the cut-off cutting part, and in a plurality of re-manufacture processes, cutting parts newly machined one after another have a shape, accuracy of coaxiality, and an outer diameter identical to the shape, the accuracy of coaxiality, and the outer diameter of the original cutting part.

2. The reusing method of an end mill according to claim 1, wherein
   a line indicating a cut-off position of the cutting part is provided in advance on the shank part along an outer periphery of the shank part.

* * * * *